United States Patent
Schroepf et al.

(10) Patent No.: US 9,582,318 B2
(45) Date of Patent: Feb. 28, 2017

(54) METHOD, COMPUTER PROGRAM PRODUCT AND SYSTEM FOR SWITCHING APPLICATION PROGRAMS

(71) Applicant: Bayerische Motoren Werke Aktiengesellschaft, Munich (DE)

(72) Inventors: Tobias Schroepf, Munich (DE); Michael Huebler, Dasing (DE); Andreas Netzmann, Eresing (DE); Manuel Binna, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 58 days.

(21) Appl. No.: 14/741,076

(22) Filed: Jun. 16, 2015

(65) Prior Publication Data

US 2016/0371114 A1 Dec. 22, 2016

Related U.S. Application Data

(63) Continuation of application No. PCT/EP2013/076634, filed on Dec. 16, 2013.

(30) Foreign Application Priority Data

Dec. 18, 2012 (DE) .......................... 10 2012 223 641

(51) Int. Cl.
*G06F 3/00* (2006.01)
*G06F 9/44* (2006.01)
(Continued)

(52) U.S. Cl.
CPC ............ *G06F 9/4843* (2013.01); *G06F 21/64* (2013.01)

(58) Field of Classification Search
None
See application file for complete search history.

(56) References Cited

U.S. PATENT DOCUMENTS

2010/0146449 A1 6/2010 Brown et al.
2011/0138370 A1 6/2011 Albert et al.

OTHER PUBLICATIONS

German Search Report dated Aug. 5, 2013, with English translation (Eleven (11) pages).

(Continued)

*Primary Examiner* — Craig Dorais
(74) *Attorney, Agent, or Firm* — Crowell & Moring LLP

(57) ABSTRACT

In a processor-controlled multimedia terminal connected to a processor-controlled multimedia docking device, a group of application programs is stored and made available for execution. The application programs can run on the multimedia terminal in the foreground or background. Only one application program of the group is executed in the foreground at one time. An application program can output data via a graphical user interface while running in the foreground. While running in the background, however, an application program cannot output data via the graphical user interface. In the multimedia terminal, a memory area is also provided, to which the application programs have read and write access during execution thereof. An application-specific data set is stored in the memory area for each application program, the data set remaining in the memory area even after the respective application program has ended. A first application program, during execution thereof in the multimedia terminal, reads the application-specific data sets of the other application programs of the group and stores them in a list. The list is also transmitted to the multimedia docking device. Data for the application programs contained in the list is displayed on the multimedia docking device. An application program is selected from the list as the second application program. A switchover is then made in the multimedia terminal from the execution of the first application program to an execution of the second application program by the multimedia docking device, wherein the execution of the first application program in the (Continued)

foreground on the multimedia terminal is ended and the second application program is brought to run in the foreground.

14 Claims, 2 Drawing Sheets

(51) Int. Cl.
    *G06F 9/46*     (2006.01)
    *G06F 13/00*     (2006.01)
    *G06F 9/48*     (2006.01)
    *G06F 21/64*     (2013.01)

(56) References Cited

OTHER PUBLICATIONS

International Search Report (PCT/ISA/210) dated Mar. 27, 2014, with English translation (Four (4) pages).
Bose, et al., "Morphing Smart-phones into Automotive Application Platforms", Nokia Research Center Palo Alto, IEEE Computer Society, May 2011, 44. Jg., Nr. 5, S. 53-61., http://ieeexplore.ieee.org/stamp/stamp.jsp?tp=&arnumber=5744063&isnumber=5767713.
Bose, et al., "Terminal Mode—Transforming Mobile Devices into Automotive Application Platforms", Proceedings of the $2^{nd}$ International Conference on Automotive User Interfaces and Interactive Vehicular Applications, ACM, Nov. 11-12, 2010, Pittsburgh, Pennsylvania, USA, pp. 148-155, (Eight (8) pages).
Hueger, "User interface transfer for driver information systems: a survey and an improved approach", Proceedings of the $3^{rd}$ International Conference on Automotive User Interfaces and Interactive Vehicular Applications, Studies Effects in the Car, Salzburg, Austria, Nov. 30-Dec. 2, 2011, (Eight (8) pages).
Sonnenberg, "Service and user interface transfer from nomadic devices to car infotainment systems", Proceedings of the $2^{nd}$ International Conference on Automotive User Interfaces and Interactive Vehicular Applications, ACM, Nov. 11-12, 2010, Pittsburgh, Pennsylvania, USA, pp. 162-165, (Four (4) pages).
VNC Automotive, "Driving innovation between mobile and vehicle", Real VNC, 2012, pp. 1-2, http://www.realvnc.com/services/automotive.html, (Two (2) pages).
Ramey, et al., "Bash Reference Manual Reference Documentation for Bash Edition 4.2, for Bash Version 4.2 Dec. 2010", Dec. 1, 2010, XP055108031, https://www.gnu.org/s/bash/manual/bash.pdf, pp. 1-160, (One Hundred and Sixty (160) pages).
Scribner, et al., "GNUPG Frequently Asked Questions", Jun. 30, 2003, XP002286317, http://www.gnupg.org/documentation/faqs.html, pp. 1-32, (Thirty-two (32) pages).

METHOD, COMPUTER PROGRAM PRODUCT AND SYSTEM FOR SWITCHING APPLICATION PROGRAMS

CROSS REFERENCE TO RELATED APPLICATIONS

This application is a continuation of PCT International Application No. PCT/EP2013/076634, filed Dec. 16, 2013, which claims priority under 35 U.S.C. §119 from German Patent Application No. 10 2012 223 641.4, filed Dec. 18, 2012, the entire disclosures of which are herein expressly incorporated by reference.

BACKGROUND AND SUMMARY OF THE INVENTION

The invention relates to a method, a computer program product, and a system for switching application programs. The invention relates, in particular, to a system in which a processor-controlled mobile terminal device is connected to a processor-controlled device integrated in a vehicle. In this case, an application program can be executed on the terminal device in particular and switched to another application program by way of the vehicle-integrated device. The application program can be a so-called app in particular, which is typically loaded and executed in a mobile smartphone device having a graphic user interface and can have an informative name. Apps establish a connection to Internet services or to social networks, for example, or offer other functions such as email functions, calculator functions, etc.

Smartphones can be designed so that only a limited number of apps, in particular only one app or only one app of a specific category, can be executed at a specific point in time. Multiple apps accordingly cannot be executed in parallel. On the one hand, this has the advantage that the smartphone processor only has to process the one app in addition to the operating system programs. Therefore, the app can be processed more rapidly and reliably than if a variety of apps run simultaneously on the smartphone. On the other hand, the operation is substantially more comprehensible and easier for the user of the smartphone if only one app at a time is executed. This is true in particular if the display screen area of the smartphone is quite limited and a sufficient overview of the current running states of all apps cannot be provided to the user simultaneously.

If a mobile terminal device such as a smartphone is connected to a device integrated in a vehicle, for example, to an infotainment device, the risk then exists that the driver of the vehicle will be distracted by switching between apps during travel. This risk exists, in particular, if the switching can be performed only directly on the terminal device and, for example, its display screen and/or operating buttons are relatively small.

A method for exchanging data between apps is described in US 2011/0138370 A1.

Switching between various websites or applications for a display screen representation by use of a switching application, which displays multiple selection options simultaneously, in conjunction with an Internet browser is known from US 2010/0146449 A1.

The contents of the above-mentioned publications are hereby incorporated by reference in the present description.

It is the object of the invention, in a mobile multimedia terminal device, which is connected to a second device, a so-called multimedia docking device, to enable switching between two application programs in a simple manner if the switching is performed by way of the multimedia docking device.

This and other objects are achieved according to the invention by a processor-controlled multimedia terminal device, which is connected to a processor-controlled multimedia docking device. A group of multiple application programs, which are provided for execution, is stored on the multimedia terminal device. Application programs can run on the multimedia device in the foreground and in the background. When running in the foreground, an application program can output data via a graphic user interface. Only one of the application programs of the group is executed at one point in time in the foreground. When running in the background, in contrast, an application program cannot output data via the graphic user interface. A storage region is provided in the multimedia terminal device, to which the application programs have read and write access during their execution. An application-specific data set is stored in the storage region for each of the application programs, which is also maintained in the storage region after the ending of the respective application program. For switching application programs in the multimedia terminal device, it is provided that a first application program, during its execution, reads the application-specific data sets of the other application programs of the group and stores them in a list in the multimedia terminal device. The list is transferred to the multimedia docking device. Data on the application programs contained in the list are displayed on the multimedia docking device. Switching from the execution of the first application program to an execution of the second application program in the multimedia terminal device is performed by way of the multimedia docking device, wherein the execution of the first application program in the foreground on the multimedia terminal device is ended and the second application program is moved to run on the multimedia terminal device in the foreground.

The invention is based on the discovery that it is advantageous for switching, which is remote-controlled by way of the multimedia docking device, from a first application program to a second application program, which are executed in the multimedia terminal device, to store data of the application programs in the storage region. Furthermore, it has been recognized that it is advantageous to make the storage region accessible to all application programs. In addition, it has been recognized that the switching is simplified if the respective executed application program stores the data of the other application programs in a list. The list can thus be transferred with little effort from the multimedia terminal device to the multimedia docking device and it can also be stored therein. The storage of the list can be performed in the volatile working memory of the respective device. The list, which is generated for one application program, having the data of the other application programs can be kept in the memory in each case as long as the one application program runs in the foreground. It can then be erased.

The list can advantageously be used in the multimedia docking device to enable the user, with a comprehensible quantity of information, to select and switch to another application program in the multimedia terminal device. This is advantageous in particular if the switching in a vehicle is performed by the vehicle driver, because he is hardly distracted from driving the vehicle due to the simple selection capability and the simple, user-friendly switching. This is all the more true the smaller the display screen area and the operating elements, for example, mechanical or touch screen buttons of the multimedia terminal device and the larger or more convenient, in relation thereto, are the operating and display elements are on the multimedia docking device.

The switching, including the closing of the first application program and the starting of the second application program, can be at least partially automated and thus substantially simplified by the invention. In addition, for example, in conjunction with a multimedia docking station which is permanently installed in a motor vehicle, individual different display and/or operating elements can be provided than are on the multimedia terminal device, which display and/or elements are adapted to driving the vehicle. For example, display elements such as a large display screen and/or adapted operating elements, for example, operating wheels (scroll wheels) or buttons attached in the vicinity of the steering wheel or directly on the steering wheel can be provided. The display can occur in a position which is easy to observe by the driver, for example, in the display console region of the vehicle in the case of a multimedia and navigation display area. The multimedia terminal device can then be stowed out of sight in an armrest console in the vehicle, for example, because the vehicle driver does not have to operate it. The selection of the application programs can be substantially simplified, for example, in that only selected or shortened data or items of information on the application program, in particular data of the application-specific data set in a selection list, are displayed in the vehicle. Convenience and safety during driving of a vehicle are increased further by such vehicle-specific adaptations.

The invention is applicable particularly advantageously in smartphones, on which computer programs can run in the foreground or in the background as described. Such an operating mode can occur, for example, if a multimedia terminal device is controlled using the operating system iOS (iPhone OS) from Apple Inc. In this case, it can also be provided that an application program running in the foreground is assigned computing time as a matter of priority on a microprocessor during its activation, while programs which are activated in the background are only assigned computing time in a relatively limited or subordinate manner.

In one advantageous exemplary embodiment of the invention, the application-specific data set of the application programs comprises, in each case, at least one identification of the application, a target address, under which the respective application program is retrievable in the multimedia terminal device, and a signature. The identification can be a name of the application, for example. The target address can be a uniform resource locator (URL) address, for example, in particular an address within the multimedia terminal device. The signature of the application can be provided in particular for checking the data set or the useful data contained therein, for example, the name and the URL. For this purpose, a controller having a computer program module can be provided in the multimedia terminal device, which checks the signature before the application program can be displayed on the multimedia docking device. The application-specific data set can comprise further data, for example, a graphic symbol of the application program.

In a further preferred exemplary embodiment of the invention, in each case a check of the signature thereof is initiated by the first application for the application-specific data sets of the further application programs of the group and the respective application programs are only included in the list upon passing the signature check. With these measures, an integrated signature check can be performed such that only those application programs are included in the list whose signature of the useful data of the data set is unchanged and valid and which are authorized for the selection on the multimedia docking device. This also contributes to the scope of the list being restricted, specifically to those application programs which have a valid signature. Accordingly, only these application programs are offered for selection in the multimedia docking device.

In addition, application programs can be prevented from being offered to the vehicle driver, which were automatically stored without his intention on the multimedia terminal device, so-called spam application programs. Application programs in the meaning of the present invention are computer programs oriented to an application in particular.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
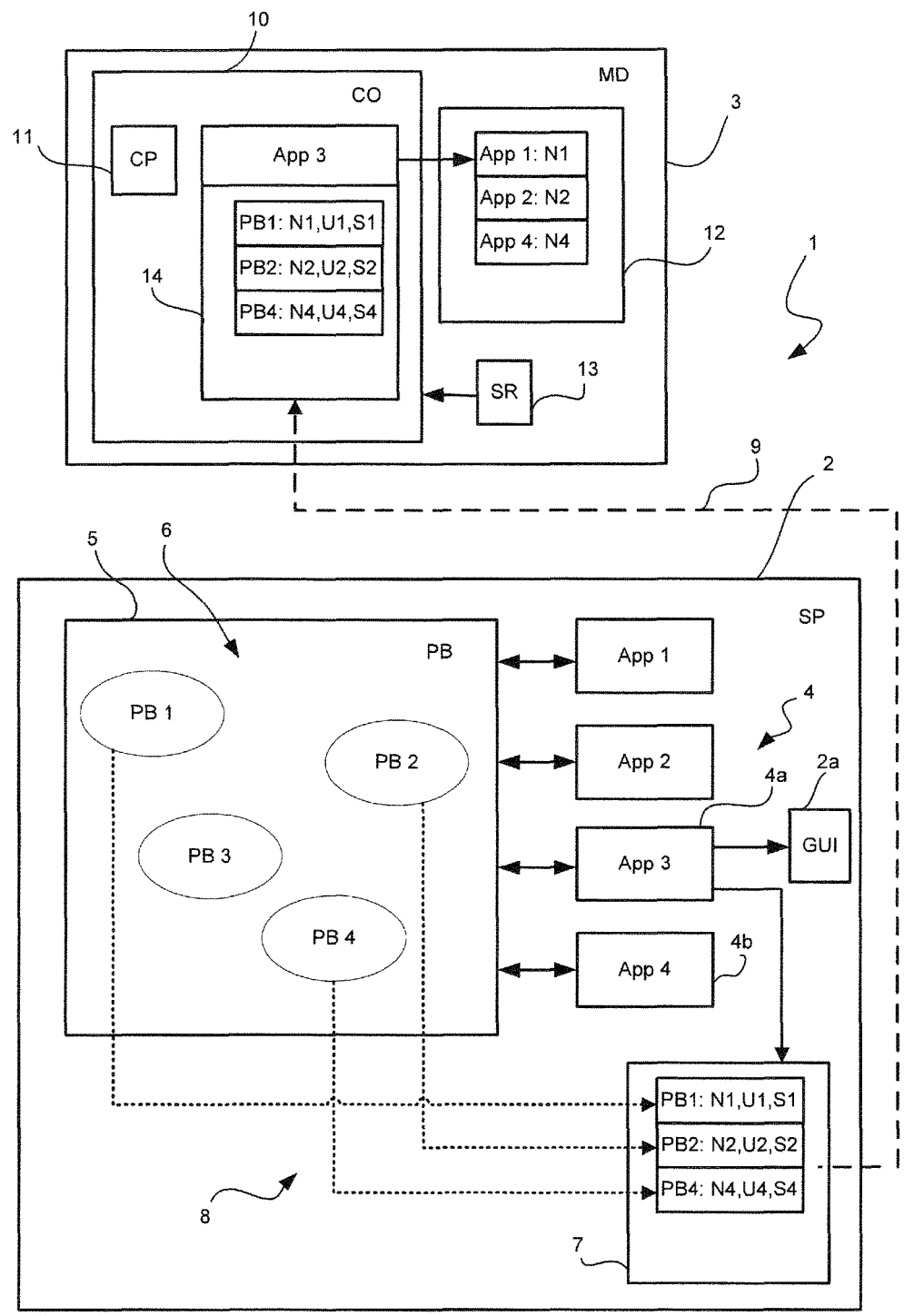
FIG. 1 is a schematic block diagram showing a system according to an embodiment of the invention.

In the system 1 shown in FIG. 1, a smartphone 2 is connected to a vehicle infotainment system 3. Both are controlled by one microprocessor in each case, and are capable of playing back multimedia content. The vehicle infotainment system 3 is permanently installed in a vehicle and can additionally display vehicle information such as the vehicle speed, vehicle position data including a navigation map, etc. It can also contain further multimedia devices, for example, a broadcast radio receiver, a CD/DVD player, etc. Application programs 4 are stored in the smartphone 2, for example, in a nonvolatile memory, and are thus provided for execution. The application programs can be executed in the foreground or in the background in the scope of the entire program sequence or the controller of the smartphone 2. In each case, only one application program is executed at one point in time in the foreground of the application programs 4. In contrast, a plurality of the application programs 4 can run simultaneously in the background. A volatile operating memory (RAM) of the smartphone 2 is used in each case in a way known per se for the overall program sequence.

All four application programs 4, namely app1, app2, app3, and app4, prepare application-specific data sets 6 (paste boards, PBi, i=1 . . . 4) in the course of their execution in a memory region 5 (paste board, PB), in which they each store their names (Ni), a URL (Ui) address with a so-called URL scheme, under which they are retrievable in the smartphone 2, and a respective signature of the useful data of the data set (Si). The signatures are used to ensure that the contents of the data sets were not changed or prepared by unauthorized spam apps.

In the example shown in FIG. 1, application program 4a "app3" is presently executed in the foreground, which outputs data via the graphic user interface (GUI) 2a of the smartphone 2 and can communicate with the vehicle infotainment system 3. One or more of the remaining application programs 4 can run in the background on the smartphone 2.

The application program 4a "app3" prepares a list 7 via the data paths 8, in which it enters the data of the application-specific data sets 6 thereof (Ni, Ui, Si) for each of the other application programs 4. For this purpose, the application-specific paste boards PBi of all other application programs 4 are located according to the predefined data pattern (Ni, Ui, Si) and the signature thereof is checked. Therefore, those application programs 4 which are also compatible with the vehicle infotainment system 3 are located and selected in the smartphone 2.

Via data path 9, the application program 4a "app3" transfers the contents of the list 7 into a controller 10 of the vehicle infotainment system 3. A computer program 11 stored therein is executed and controls a graphic user interface (GUI) 12. It also processes user inputs, which are performed via a scroll wheel 13. Inputs can also be performed via graphic elements if the user interface 12 is a touch screen. The controller 10 or the computer program 11 running therein processes the items of information of the list 7 of the application 4a "app3". If a request arrives via the scroll wheel 13 to switch to another application, the computer program 11 then displays, from the data of the other application programs 4, the names of each of them in a list 14 on the graphic user interface 12. If one of these applications app1, app2, or app4 is selected, for example, "app4" having the name (N4) "Facebook", computer program 11 then causes the ending of the active application 4a "app3" in the foreground via the items of URL information stored in list 7 in the smartphone 2 and the subsequent opening of the corresponding new application 4b "app4", for example, "Facebook" in the foreground via its URL "fb://friends". The application 4b can already be running beforehand in the background in this case and only be brought into the foreground or it can be started entirely newly in the foreground. The application 4a can either be entirely ended or only moved from the foreground into the background. Moving an application into the foreground or background can be performed by a corresponding higher-order program controller and, for example, on the basis of a parameter associated with the respective application.

Figure 2:
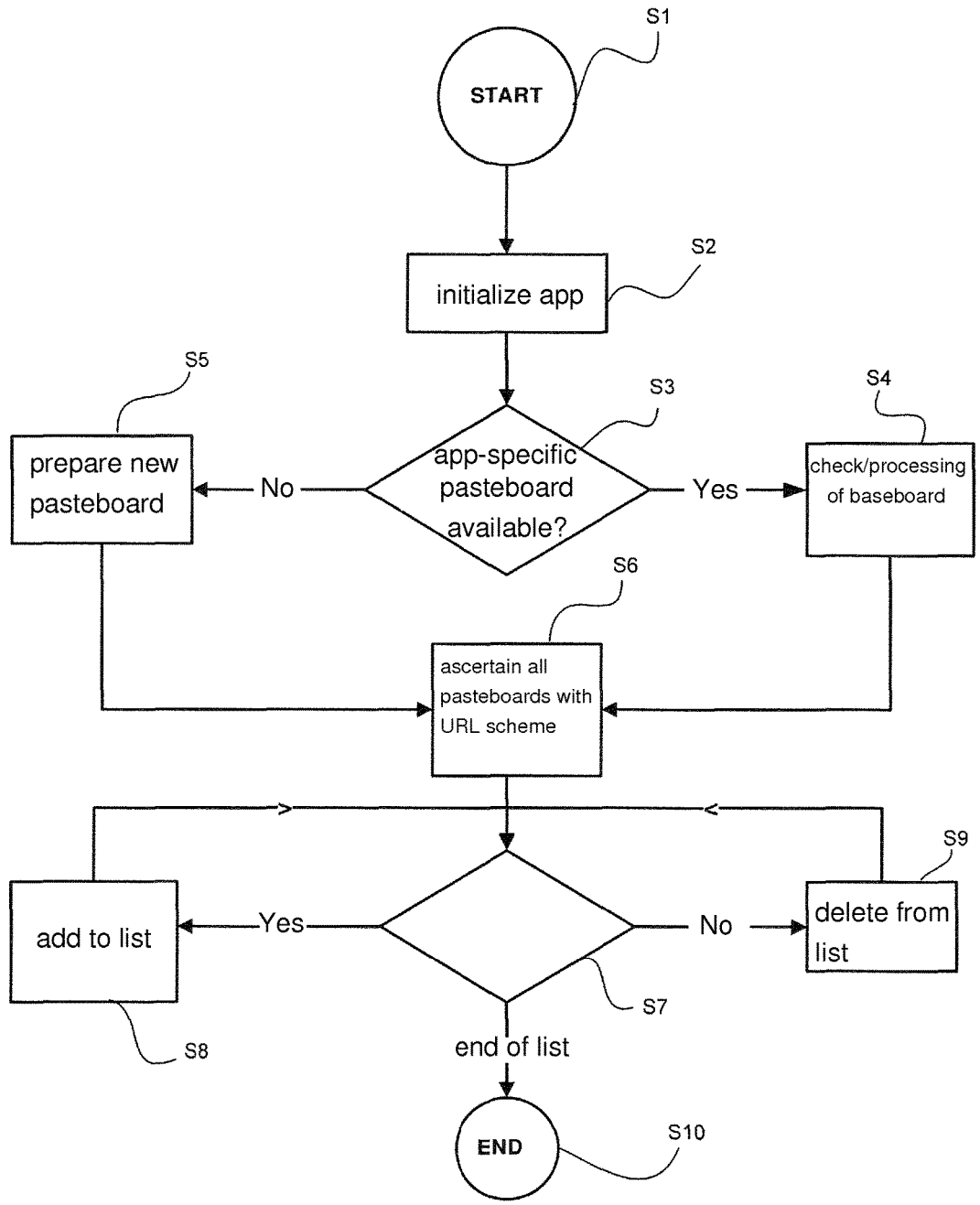
FIG. 2 is a flow chart.

In FIG. 2, the method, which is described with reference to the application program 4a "app3" preparing the list 7, is illustrated in a flow chart. The method starts in step 1, the application program 4a is initialized in step S2. It is checked in step S3 whether an application-specific pasteboard is already available for the application program 4a. The pasteboard is optionally checked in step S4 and processed if necessary. If the check in step S3 is negative, a new application-specific pasteboard is prepared for the application program 4a in step S5. After step S4 or S5, respectively, all application-specific pasteboards available in the pasteboard memory 5 and the individual data sets thereof including the URLs thereof are ascertained in step S6. In a loop for all application-specific pasteboards, it is checked in step S7 whether the signature thereof is valid. If necessary, the respective application-specific data is added to the list 7 in step S8. If step S7 has the result that the signature of the data set is not valid for an application program, the respective application program with its data is not included in list 7 or is deleted from list 7 and the data set (pasteboard) is erased in the global storage region in step S9. Other application-specific pasteboard data, which are contained in an existing list 7 and the application programs of which fulfill the signature conditions, are also still contained in the corresponding storage region of the memory 5 after the ending of the respective application program. After passing through all application programs or at the end of the list, the sequence is ended in step S10.

The described devices and system components are controlled in particular using computer programs and can have further elements of computers and digital control units known per se for this purpose, for example, a microprocessor, volatile and nonvolatile memories, interfaces, etc. The invention can therefore also be implemented entirely or partially in the form of a computer program product, which entirely or partially causes a sequence according to the invention upon loading and execution on a computer. For example, it can be provided in the form of a data carrier such as a CD/DVD or also in the form of a file or multiple files on a server, from which the computer program can be downloaded.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for switching application programs in a processor-controlled multimedia terminal device, which is connected to a processor-controlled multimedia docking device, the method comprising the acts of:
    storing and providing for execution a group comprising multiple application programs on the multimedia terminal device, the application programs being executable on the multimedia terminal device in a foreground or in a background, wherein an application program can output data via a graphic user interface when running in the foreground, and cannot output data via the graphic user interface when running in the background;
    executing only one application program from the group at one point in time in the foreground;
    providing a storage region in the multimedia terminal device, to which the application programs have read and write access during execution thereof;
    storing an application-specific data set, which is also maintained in the storage region after an ending of the respective application program, in the storage region for each of the application programs;
    reading, by a first application program, the application-specific data sets of other of the multiple application programs and storing them in a list during execution of the first application program in the multimedia terminal device;
    transferring the list to the multimedia docking device;
    displaying data on the application programs contained in the list on the multimedia docking device;
    selecting an application program from the list as a second application program; and
    by way of the multimedia docking device, switching, in the multimedia terminal device, from the execution of the first application program to an execution of the second application program, wherein the execution of the first application program in the foreground on the multimedia terminal device is ended and the second application program is caused to run in the foreground on the multimedia terminal device.

2. The method according to claim 1, wherein the application-specific data sets of the application programs at least comprises, in each case:
    an identification of the application program,
    a target address, under which the respective application program is retrievable, and
    a signature for useful data of the data set.

3. The method according to claim 2, wherein a check of the signature is caused in each case by the first application program for the application-specific data sets of further application programs and the respective application programs are only incorporated in the list upon passing the signature check.

4. The method according to claim 3, wherein the target address is a uniform resource locator address.

5. The method according to claim 2, wherein the target address is a uniform resource locator address.

6. A non-transitory computer-readable medium, comprising instructions stored thereon, that when executed perform the steps of:
   storing and providing for execution a group comprising multiple application programs on the multimedia terminal device, the application programs being executable on a multimedia terminal device in a foreground or in a background, wherein an application program can output data via a graphic user interface when running in the foreground, and cannot output data via the graphic user interface when running in the background;
   executing only one application program from the group at one point in time in the foreground;
   providing a storage region in the multimedia terminal device, to which the application programs have read and write access during execution thereof;
   storing an application-specific data set, which is also maintained in the storage region after an ending of the respective application program, in the storage region for each of the application programs;
   reading, by a first application program, the application-specific data sets of other of the multiple application programs and storing them in a list during execution of the first application program in the multimedia terminal device;
   transferring the list to a multimedia docking device;
   displaying data on the application programs contained in the list on the multimedia docking device;
   selecting an application program from the list as a second application program; and
   by way of the multimedia docking device, switching, in the multimedia terminal device, from the execution of the first application program to an execution of the second application program, wherein the execution of the first application program in the foreground on the multimedia terminal device is ended and the second application program is caused to run in the foreground on the multimedia terminal device.

7. The non-transitory computer-readable medium according to claim 6, wherein the application-specific data sets of the application programs at least comprises, in each case:
   an identification of the application program,
   a target address, under which the respective application program is retrievable, and
   a signature for useful data of the data set.

8. The non-transitory computer-readable medium according to 7, wherein a check of the signature is caused in each case by the first application program for the application-specific data sets of further application programs and the respective application programs are only incorporated in the list upon passing the signature check.

9. The non-transitory computer-readable medium according to claim 6, wherein the target address is a uniform resource locator address.

10. A system, comprising:
    a multimedia terminal device;
    a multimedia docking device; and
    a non-transitory computer-readable medium comprising instructions stored thereon that when executed perform the steps of:
    storing and providing for execution a group comprising multiple application programs on the multimedia terminal device, the application programs being executable on the multimedia terminal device in a foreground or in a background, wherein an application program can output data via a graphic user interface when running in the foreground, and cannot output data via the graphic user interface when running in the background;
    executing only one application program from the group at one point in time in the foreground;
    providing a storage region in the multimedia terminal device, to which the application programs have read and write access during execution thereof;
    storing an application-specific data set, which is also maintained in the storage region after an ending of the respective application program, in the storage region for each of the application programs;
    reading, by a first application program, the application-specific data sets of other of the multiple application programs and storing them in a list during execution of the first application program in the multimedia terminal device;
    transferring the list to the multimedia docking device;
    displaying data on the application programs contained in the list on the multimedia docking device;
    selecting an application program from the list as a second application program; and
    by way of the multimedia docking device, switching, in the multimedia terminal device, from the execution of the first application program to an execution of the second application program, wherein the execution of the first application program in the foreground on the multimedia terminal device is ended and the second application program is caused to run in the foreground on the multimedia terminal device.

11. The system according to claim 10, wherein the application-specific data sets of the application programs at least comprises, in each case:
    an identification of the application program,
    a target address, under which the respective application program is retrievable, and
    a signature for useful data of the data set.

12. The system according to claim 11, wherein a check of the signature is caused in each case by the first application program for the application-specific data sets of further application programs and the respective application programs are only incorporated in the list upon passing the signature check.

13. The system according to claim 10, wherein the target address is a uniform resource locator address.

14. The system according to claim 10, wherein the multimedia terminal device is a mobile wireless telephone having multimedia function and the multimedia docking device is an infotainment system installed in a vehicle.

* * * * *